United States Patent [19]

Altman

[11] 4,452,104
[45] Jun. 5, 1984

[54] MULTI SEQUENCE PROCESSING APPARATUS EQUIPPED WITH FAIL SAFE INDEXING MECHANISM

[76] Inventor: James E. Altman, 105 Altman Rd., Gray, Ga. 31032

[21] Appl. No.: 346,655

[22] Filed: Feb. 8, 1982

Related U.S. Application Data

[63] Continuation-in-part of Ser. No. 958,177, Nov. 6, 1978, abandoned.

[51] Int. Cl.³ .............................................. B23B 29/24
[52] U.S. Cl. .......................................... 74/822; 99/544
[58] Field of Search ................. 74/118, 155, 822, 827; 99/544, 549, 565

[56] References Cited

U.S. PATENT DOCUMENTS

| 1,136,891 | 4/1915 | Candee | 74/124 |
|---|---|---|---|
| 2,683,477 | 7/1954 | Altman | 99/546 |
| 2,688,993 | 9/1954 | White | 99/544 |
| 3,162,225 | 12/1964 | Loveland | 99/491 |
| 3,434,517 | 3/1969 | Durand, Jr. | 99/544 |
| 3,563,289 | 2/1971 | Altman | 99/563 |

Primary Examiner—Leslie A. Braun
Assistant Examiner—Frank McKenzie
Attorney, Agent, or Firm—Hill, Van Santen, Steadman & Simpson

[57] ABSTRACT

In processing apparatus, especially fruit processing machinery, incorporating two functional subassemblies with movements which are synchronous with respect to one another, there is provided a fail safe indexing mechanism which prevents operation of one or the other of such subassemblies should for any reasons apparatus operational sequencing or synchronization be interrupted. The fail safe means utilizes a ratchet having a locking means to prevent over-travel thereof. In addition, a signalling means is associated with the locking means which allows operation of one subassembly only during a limited period of each machine cycle, provided all assemblies and sub-assemblies are in their normal location for that period of the timing cycle.

6 Claims, 9 Drawing Figures

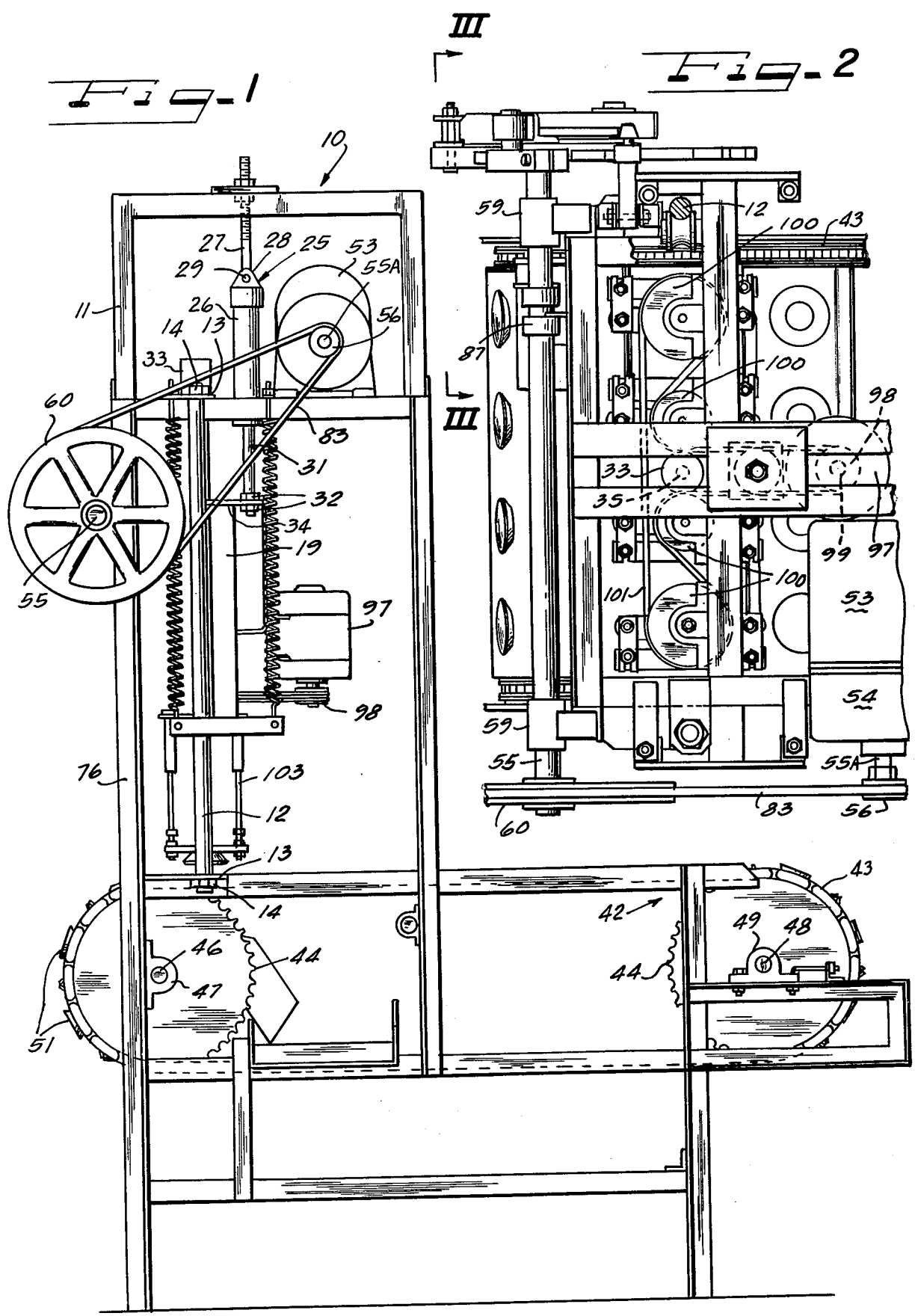

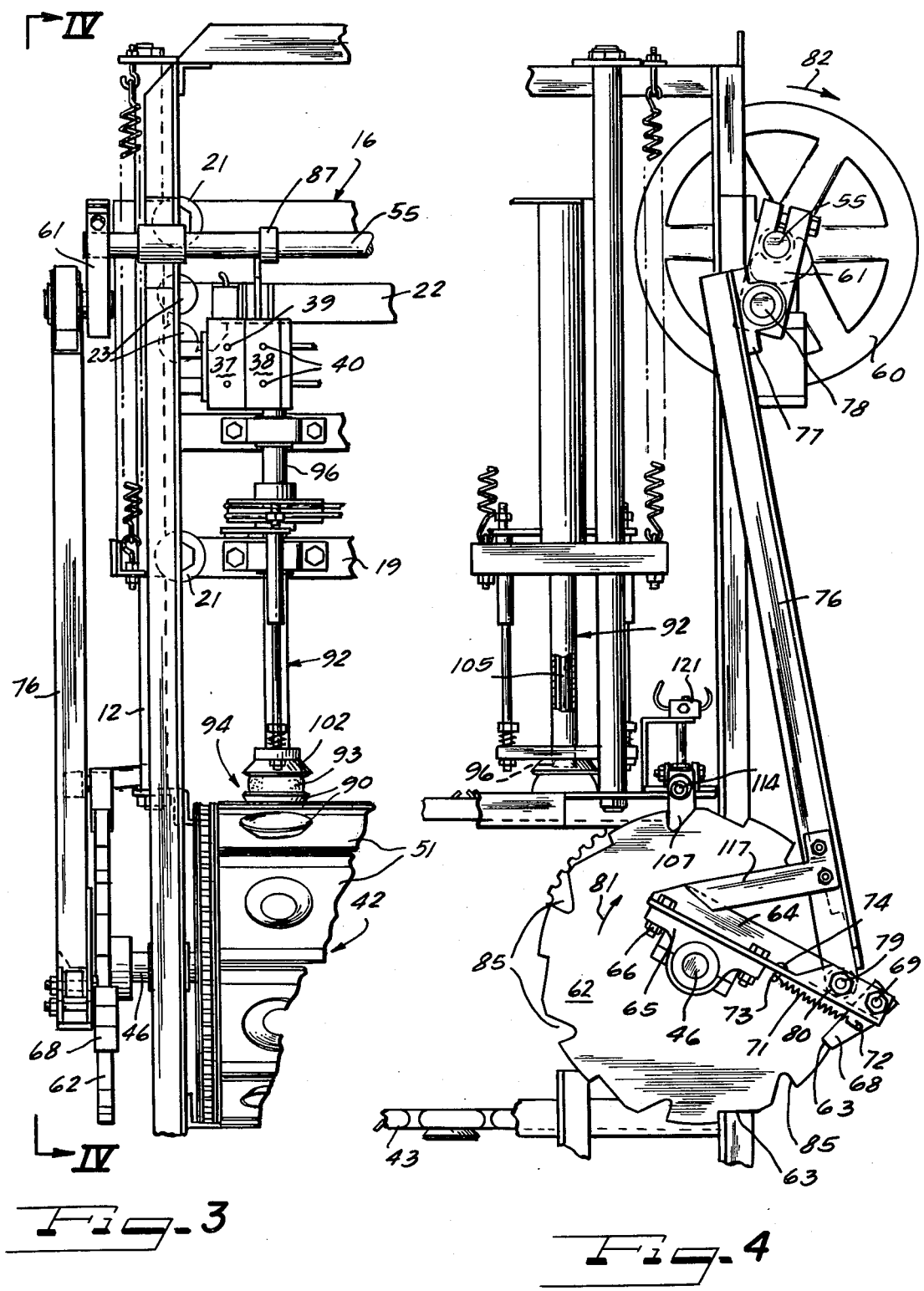

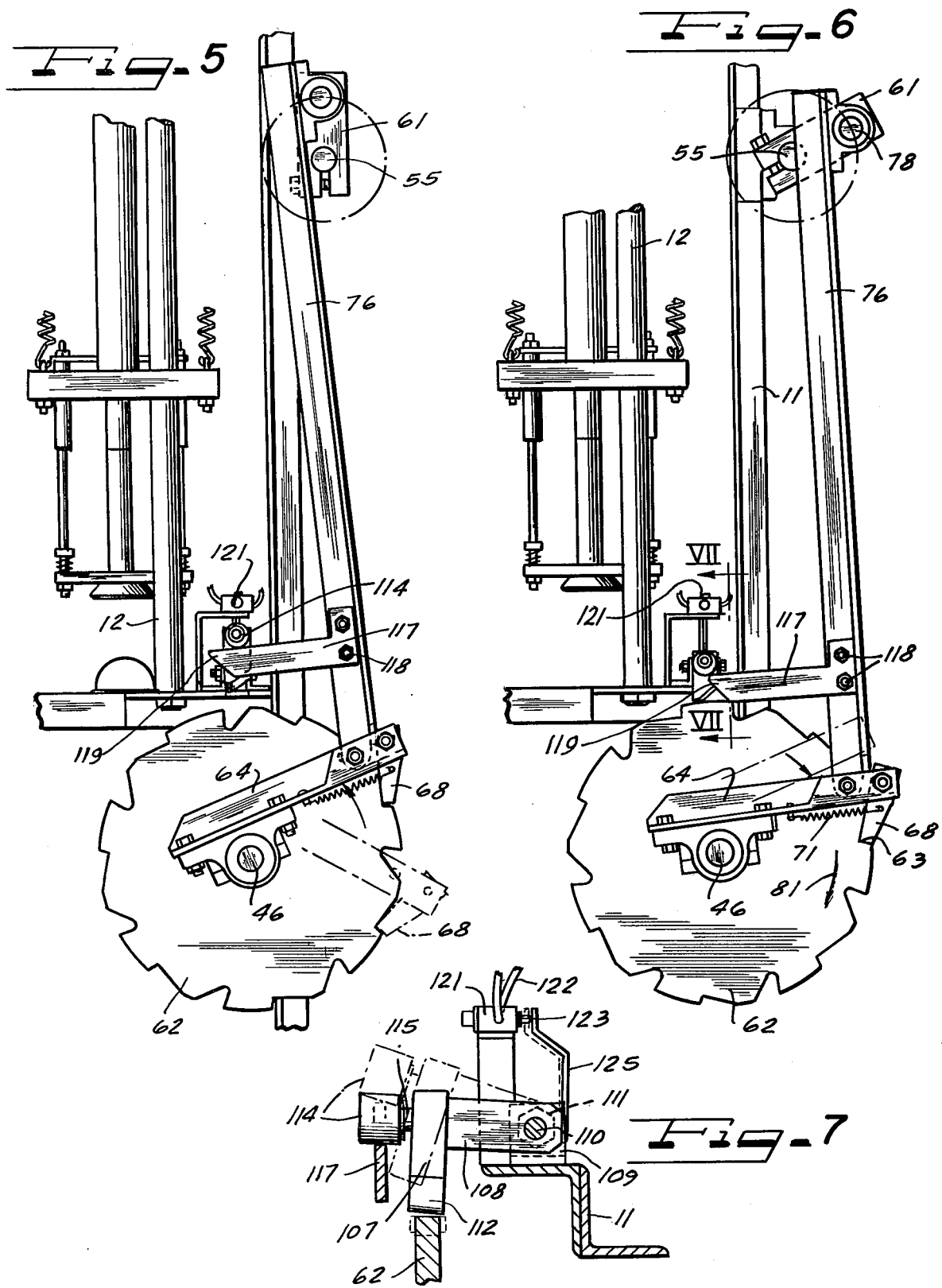

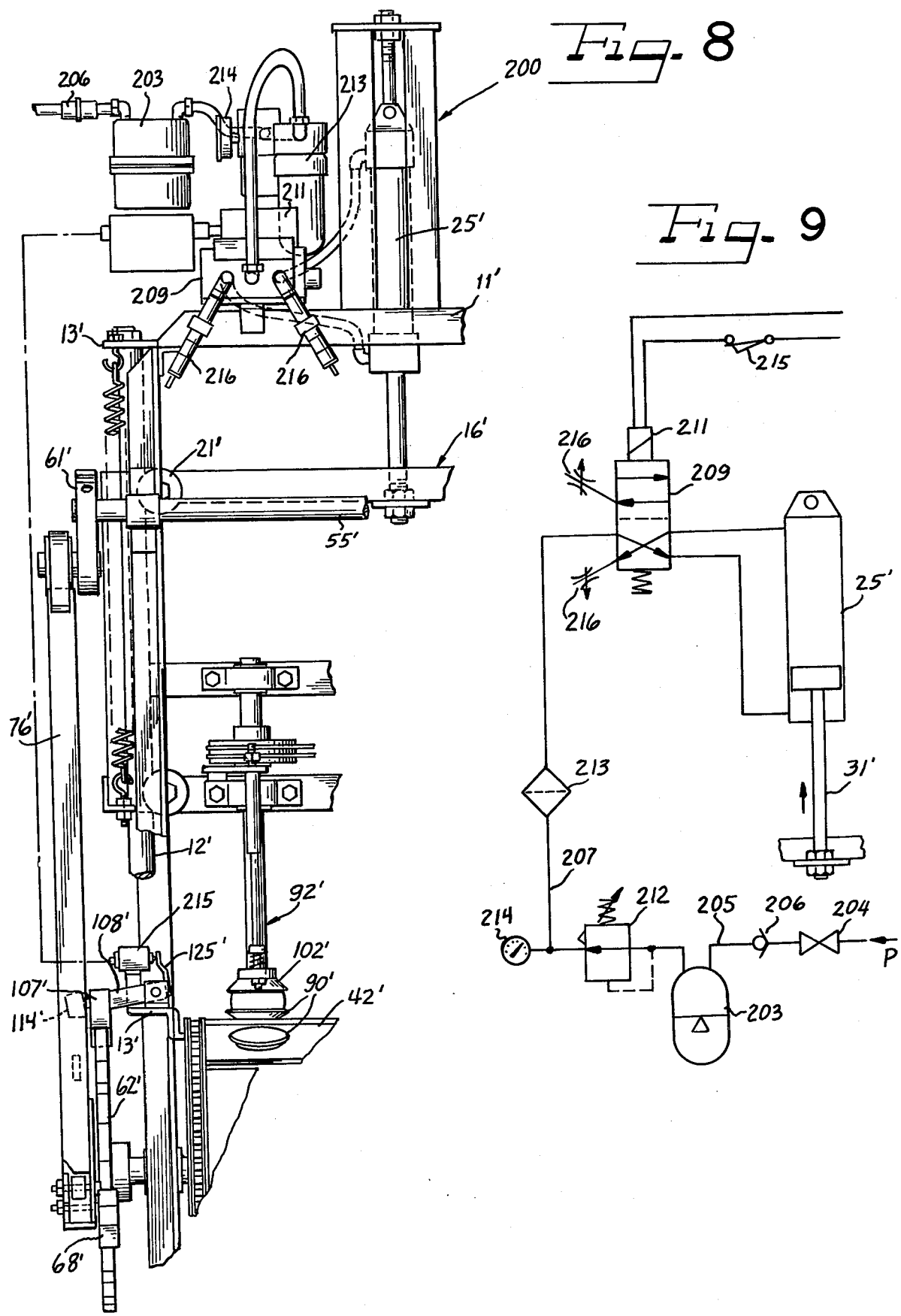

MULTI SEQUENCE PROCESSING APPARATUS EQUIPPED WITH FAIL SAFE INDEXING MECHANISM

RELATED APPLICATION

This application is a continuation-in-part of my earlier filed U.S. patent application U.S. Ser. No 958,177, filed Nov. 6, 1977 now abandoned.

BACKGROUND OF THE INVENTION

In the art of processing machinery, especially fruit processing machinery, it is known to provide a conveying means for advancing work pieces successively to and through a work station, such as in a stop and go manner. In the region of the work station, another machine subassembly performs work fucntions upon work pieces located in the work station. Means for energizing and synchronizing machine operational sequences are known.

In use, such processing machinery occassionally malfunctions. If during such malfunctioning, the conveyor means operates out of synchronization with the subassembly peforming one or more work functions in the work station, severe machine damage can result which can be time-consuming and costly to repair. Heretofore, little attention seems to have been paid to the possibility of equipping such machinery with fail safe devices which can effectively completely prevent such a destructive operating sequence caused by interruption of machine synchronization.

The need for an integral, fail safe means in processing machinery operating at relatively rapid cycle times and employing two different forms of power for machine energizing and operation (such as a continuously operating electric motor and discontinuously operating pneumatic cylinders) has become substantial in view of machine cost considerations and the losses generated by machine down time to a machine user. No cited prior art atttempts are known which provide fail safeness in such prior art processing machinery involving synchronization of electrical, mechanical and air logic systems.

BRIEF SUMMARY OF THE INVENTION

There has now been discovered new and improved processing apparatus incorporating means for preventing improperly synchronized operations of two functioning subassemblies thereof which are required during normal operation to be synchronously operated with respect to one another. Such means is particularly well suited for use in fruit (including vegetables) processing apparatus where one such subassembly is operated mechanically through a conversion of electrical energy of the like, and the other such subassembly is operated fluidically.

For examples, the invention is particularly well suited for application in food processing apparatus where a first subassembly is a conveyor means, such as a continuous chain system, or a turntable, and a second subassembly is a work tool system which automatically moves into and away from a work station to which work pieces are moved by the conveyor means. The second subassembly can be pneumatically operated while the first subassembly can be mechanically operated.

An object of the present invention is to provide processing machinery having at least two moving, synchronously operating subassemblies with fail safe means preventing non-synchronous operation thereof.

Another object is to provide an improved fail safe indexing mechanism adapted to prevent unsynchronized movement of a closed loop chain system means in a stop and go manner past a work station relative to a subassembly performing a systematic work functions at such work station.

Another object is to provide a simple and reliable means using a crank mechanism for preventing nonsynchronous functioning of either or both a first subassembly and a second subassembly in a processing apparatus when such subassemblies must operate sequentially in order to avoid a possibility of equipment damage.

Another object is to provide means of a class described which is particularly well suited for use with processing apparatus where the work tool system employes pneumatic cylindrical devices for achieving movement to and away from a work station.

Another object is to provide such a fail safe mechanism which additionally causes the machinery to operate after a shutdown so as to achieve a predetermined interrelationship between first and second subassemblies so that, at a subsequent start-up, safe machine operation will occur.

Other and further aims, objects, purposes, advantages, uses, and the like for the present invention will be apparent to those skilled in the art from the present specification.

BRIEF DESCRIPTION OF DRAWINGS

In the drawings:

FIG. 1 is a side elevational view of one embodiment of apparatus of the present invention;

FIG. 2 is a fragmentary top plan view of the embodiment of FIG. 1;

FIG. 3 is a fragmentary, detail-type end view taken along the line III—III of FIG. 2 showing the crank mechanism in its extreme down position;

FIG. 4 is a detail view taken along the line IV—IV of FIG. 3 showing a side view of the crank mechanism in the same position as shown in FIG. 3;

FIG. 5 is a view similar to FIG. 4 but showing the crank mechanism in its extreme up position;

FIG. 6 is a view similar to FIG. 4 but showing the crank mechanism in an intermediate position;

FIG. 7 is a vertical sectional view taken along the line VII—VII of FIG. 6;

FIG. 8 is a fragmentary, detail-type, in view similar to FIG. 3 but showing an alternative embodiment of the present invention; and FIG. 9 is a schematic diagram illustrating the operation of the embodiment shown in FIG. 8.

DETAILED DESCRIPTION

Referring to the drawings, especially FIGS. 1 through 3, there is seen an automatic synchronized multiple station coring apparatus for citrus fruit and the like which is herein designated in its entirety for convenience by the numeral 10. Apparatus 10 incorporates a frame 11 formed of angle iron sections, or the like, which are welded together, or the like at positions of jointure. Frame 11 supports and rigidly mounts a pair of cross-sectionally circular bearing bars 12, each bar 12 being in spaced, parallel relationship to the other thereof. In apparatus 10, bars 12 are normally vertical. For purposes of mounting bars 12 to frame 11, each bar 12 is here threaded adjacent opposed end portions therefrom and each bar 12 is extended between a pair of support plates 13, the plates 13 being integrally rigidly associated with frame 11, each end of each bar 12 being secured to a different plate 13 by nuts 14 threadably secured thereover.

Apparatus 10 incorporates a first carriage assembly which is herein designated in its entirety by the numeral 16. Carriage assembly 16 is adapted for stabilized reciprocal movements vertically between respective upper and lower positions relative to frame 11, the upper position being suggested, for example, in FIG. 5, and the lower position being shown, for example, in FIG. 4. Carriage assembly 16 incorporates a rectangular carriage frame 19 here formed of angle iron sections, or the like, as desired, which are welded together, or the like, at points of jointure. Frame 19 can have any convenient structural configuration.

To permit carriage subassembly 16 to have the capacity for reciprocal movements, a series of four circumferentially grooved bearing wheels 21 are provided. Two such wheels 21 are mounted in spaced relationship to each other along each lateral side of carriage frame 19. The groove of each wheel 21 is preferably cross sectionally hemicircular and adapted for mating rolling engagement with a bearing bar 12. Each wheel 21 is journaled for rotational movements upon a bearing wheel shaft (not detailed) mounted to first carriage frame 19.

A second carriage subassembly 22 is also incorporated into apparatus 10 which is preferably (as shown) supported within first carriage subassembly 16. Carriage subassembly 22 is defined by a transversely extending angle iron section. In order to permit carriage subassembly 22 to reciprocatorily vertically move, carriage subassembly 22 is provided with four bearing wheels 23 which are here similar to wheels 21 in structure and location relative to carriage subassembly 22, and which are located two on each end region of second carriage subassembly 22. Thus, the second carriage subassembly 22 has a stabilized capacity for vertical reciprocal movements along portions of the bearing bars 12 in a manner analogous to that provided for first carriage subassembly 16.

Reciprocal movements of first carriage subassembly 16 are effectuated by means of a pneumatic cylinder assembly 25. The terminal end of the cylinder body or housing 26 (see FIG. 1) of cylinder assembly 25 is pivotally suspended from an upper cross member of frame 11 by means of a rod 27 whose lower end is joined to a cleft 28 in housing 26 by a rivet 29 or the like. The rod 27 is threaded over a portion of its length from its upper or terminal end so that the rod 27 can be used to adjust the height of the cylinder assembly 25, and, hence, the limits of the reciprocal movements upwards and downwards can be effectuated by the cylinder assembly 25. The cylinder assembly 25 is provided with an extensible and retractable piston rod or shaft 31 whose lower end is here threaded and provided with nuts (paired) 32, and such lower end of shaft 31 is here interconnected through a flanged portion of first carriage frame 19. Cylinder assembly 25 is of the double acting pneumatic type resulting in driven extension and retraction movements of the shaft 31 thereof responsive to air cylinder pressures. Thus, carriage subassembly 16 reciprocates relative to the frame 11 along the bars 12 by means of cylinder subassembly 25.

Reciprocal movements for the second carriage subassembly 22 are similarly produced by means of a pneumatic cylinder assembly 33 whose operation and structure can be considered to be similar to that for the cylinder subassembly 25. The terminal end of the cylinder body of cylinder assembly 33 is secured to an arm 34 welded or the like to an upper mid portion of first carriage frame 19, while the extensible and retractable piston rod or shaft 35 of cylinder assembly 33 is terminally joined (not detailed) to a mid portion of second carriage subassembly 22 (see FIG. 3). Like the cylinder assembly 25, the cylinder assembly 33 is of the double acting pneumatic type so that the shaft 35 is reciprocatorily driven in response to cylinder air pressures. Thus, carriage subassembly 22 is reciprocatorily driven in response to air pressures in the cylinder subassembly 33 and the carriage subassembly 22 reciprocates relative to the carriage frame 19 and the bars 12. Any convenient cylinder mounting assembly means may be employed for the cylinder assemblies 33 and 25.

A latch member 107 is mounted adjacent one end of a latch support arm 108. The opposite end of latch support arm is pivotally mounted to frame 11. While any convenient pivotal mounting means may be employed, in the embodiment shown, frame 11 is provided with an ear 109 through which is extended a stub shaft 110 that journals and supports the opposed end of latch support arm 108. Retaining means, such as nut and washer assemblies 111, or the like, as here, are preferably employed.

The latch member 107 is provided with a configuration on its face 112 which permits such to engage latch notches 85, and, while so engaged, to prevent rotational movement of the ratchet wheel 62, the interrelationship in orientation between the latch support arm 108 and ratchet wheel 62 being such that, in the embodiment shown, the latch member 107 is urged into engagement with one of the latch notches 85 by gravity when a latch notch 85 is spatially located for engagement adjacent the latch member 107.

Extending forwardly beyond the latch member 107 from the support arm 108 is a cam follower 114 which is affixed to stub shaft 115 to provide a timing adjustment if desired. The axis of stub shaft 115 is generally perpendicular to the axis of shaft 110 and shaft 115 is at its base rigidly connected to the support arm 108. The latch member 107 is spatially located for engagement with an individual one of the latch notches 85 in a locking configuration when and while the ratchet wheel 62 is being rotated in one direction to a location where the ratchet wheel 62 is no longer being forced to rotate by the action of the pawl 68 engaging the pawl notches 63, and the lever arm 76 is being moved to its maximum limit of travel downwardly from crank arm 61.

A pick-up arm 117 is rigidly mounted at one end thereof to the lever arm 76 by any convenient mounting means, such as by nut and bolt assemblies 118 extending through suitably formed aligned apertures formed in the lever arm 76 and the end portion of the pick-up cam arm 117. The pick-up cam arm 117 is thus located at a location along the lever arm 76 between the opposed ends thereof. The pick-up cam arm 117 extends outwardly away from the lever arm 76 towards the cam follower 114 and the latch support arm 108 at an angle of projection such that the pick-up cam arm 117 at the tip portion 119 thereof engages slidably the cam follower 114 as the lever arm 76 travels when the crank arm 61 rotates. Thus, the extended upper edge portion of the pick-up cam arm 117 engages slidably the cam folower 114 and lifts the latch member 107 from the vicinity of the ratchet wheel 62 during the time interval when the ratchet wheel 62 is being advanced through engagement of the pawl 68 with pawl notches 63. When the ratchet wheel 62 is again stationary, pick-up cam arm 117 releases latch member 107, which is then engaged with an aligned latch notch 85, thereby locking the ratchet wheel 62 in a stationary position when the ratchet wheel 62 is not being rotated by the action of the lever arm 76. Thus, when the latch member 107 is so engaged with the ratchet wheel 62, no possibility exists for moving the conveyor system 42, as desired for a fail-safe locking action in the operation of the apparatus 10.

In the ratchet wheel 62, the shape of each of the latch notches 85 is such that the pawl 68 is not engageable therewith as the ratchet wheel 62 in direction 81 and slides thereover.

A pair of four-way fluid valves 37 and 38 are provided, valve 37 being adapted to operate the cylinder assembly 25, and the valve 38 being adapted to operate the cylinder assembly 33, each through associated interconnecting tubes 39 and 40, respectively. Valve 37 is activated by a conventional 3-way valve 121 which in turn is activated by lever 125 depressing the spool 123 of a 3-way valve 121. This only occurs when the ratchet lock members 107 and 108 are at their most downward position. Valve 38 is provided with a roller (not detailed) which is conveniently spring loaded, thereby adapting the roller for engagement with face of cam 87 as hereinafter explained.

Apparatus 10 is provided with a closed loop conveyor system which is herein designated in its entirety by the numeral 42. The conveyor system 42 utilizes a pair of endless drive chains 43 which are mounted about the peripheries of two pairs of longitudinally spaced sprockets 44. One pair of sprockets 44 is keyed to opposite end portions of a shaft 46 which is journalled in a pair of pillow blocks 47 for rotational movements relative to frame 11 while the other pair of sprockets 44 is keyed to opposite ends of a shaft 48 which is rotatably mounted in pillow blocks 49. Thus, the drive chains 43 translatably move about a predetermined path of travel. Transversely extending between the drive chains 43 are a plurality of longitudinally spaced, transversely flattened, aligned slat members 51 which are each secured to the drive chains 43 by means of welding, or the like, thus permitting the slat members 51 to translate with the chains 43. The interrelationship between frame 11 and conveyor system 42 is such that, once during each complete traversal of such path of travel by each slat member 51, an outside surface portion of each slat member 51 passes to and through a position of general alignment with the carriage subassemblies 22 and 16. The slat members 51 are here arranged so as to be generally perpendicular to the bearing bars 12 and equally spaced therefrom in a work station 94 where the slat members 51 pass between the bars 12. Any convenient construction can be employed for the conveyor system 42, as those skilled in the art will appreciate.

An electric motor 53 is mounted in an upper portion of the frame 11 stationarily by a bracket (not detailed). The motor 53 interconnects with a transmission assembly 54, the transmission assembly 54 being interconnected in an adjoining housing arrangement to the motor 53. Transmission 54 drives a 55a shaft on which a sheave 56 is keyed.

A shaft 55 transversely extends across and through frame 11 and is journalled adjacent its opposed end regions by a pair of bearing blocks 59 which are each secured to frame 11 by mounting means (not detailed). Adjacent one end of shaft 55 and keyed thereto in alignment with sheave 56 is sheave or pulley wheel 60. A V-belt 83, or the like, transfers power from the sheave 56 to the wheel 60, thereby rotatably driving the shaft 55.

Adjacent the opposite end of shaft 58 is clamped a crank arm 61 which is revolvably driven about the axis of shaft 55.

Shaft 55 is oriented in spaced, parallel relationship to shafts 46 and 48. Adjacent the end of shaft 46 is keyed a ratchet wheel 62. A plurality of pawl receiving surfaces or notches 63 are defined circumferentially in ratchet wheel 62 at circumferentially equally spaced intervals relative to one another. A pawl arm 64 is journalled adjacent one end thereof by a bearing block 65, which is secured to pawl arm 64 by any convenient means, such as by nut and bolt assemblies 66, for pivotal movements relative to the axis of shaft 46, with the pawl arm 64 being in adjacent relationship to ratchet wheel 62.

A pawl 68 is journalled on a shaft 69 secured to an outer end portion of pawl arm 64 by means of nut and washer assemblies 70 (not detailed) so that the pawl 68 is adapted for pivotal movements relative to the pawl arm 64 in radially spaced relationship to the axis of shaft 46. Pawl 68 is rigidly engageable with each pawl receiving notch 63 when the ratchet wheel 62 is rotating in one direction. The pawl 68 is further provided with a coiled spring member 71 (or the like) so that one end thereof is secured to a post 72 extending from pawl 68 in spaced relationship to shaft 69 while the other end thereof is secured to the shank 73 of a nut and bolt assembly 74 mounted to a mid region of the pawl arm 64. Conveniently, the pawl arm 64 is here formed of a piece of angle iron, or the like, as desired. Thus, the spring 71 provides biasing means maintaining the pawl 68 in an engagement with circumferential surface portions of ratchet wheel 62 and notches 63 formed therein. Ratchet wheel 62 is here fabricated using plate steel stock, but any convenient form of construction therefor may be employed as those skilled in the art will appreciate.

A lever arm 76 is provided which is conveniently formed of angle iron, or the like, as desired. One end of lever arm 76 is rotatably associated with the extending end portion of crank arm 61. While any convenient interconnecting means can be utilized, here a bearing block 77 is secured adjacent such one end of lever arm 76 (by means not detailed, such as nut and bolt assemblies, welding or the like), and bearing block 77 is rotatably journalled on a shaft 78 keyed to an outer end portion of the crank arm 61 with the stub shaft 78 having its axis lie in a spaced parallel relationship to the axis of shaft 55. The opposed end of the lever arm 76 is pivotally associated with the pawl arm 64 in an adjacent relationship to pawl 68. Here, though any convenient fastening means can be employed, the lever arm 76 is journalled on a shaft 79 which is mounted to pawl arm 64 by nut and washer assemblies 80. The length and position of lever arm 76 is such that ratchet wheel 62 is rotatably driven in one direction indicated by arrow 81 for a predetermined number of degrees of rotation of the ratchet wheel 62 as the crank arm 61 rotates on shaft 55. Thus, rotation of the crank arm 61 on shaft 55 in a direction of rotation indicated by arrows 82 produces a stop and go movement of the ratchet wheel 62. Such intermittent rotation of the ratchet wheel 62 drives the shaft 46 and produces a stop and go movement, as desired, of the conveyor system 42 while the motor 53 continuously drives shaft 55 with the belt 83 functionally interconnecting the sheave 56 with the pulley wheel 60. For a predeterminable number of degrees of rotation of shaft 55, shaft 46 rotates a predeterminable number of degrees, and for the remaining degrees of rotation of the shaft 55 up to 360° of rotation thereof the conveyor drive shaft 46 is stationary. As those skilled in the art will appreciate, alteration in system variables, such as, for examples, speed of shaft 55, diameter of pulley wheel 60 or sheave 56, length of crank arm 61, diameter of ratchet wheel 62, and the like, can be used to regulate the dwell or stop time of conveyor system 42, as well as the translation distance experienced by conveyor system 42, or the time required for translation of conveyor system 42 from one position to another therealong, or the like.

In addition to the pawl notches 63, the ratchet wheel 62 is further provided with a plurality of latch notches 85 which are defined therein at circumferentially equally spaced intervals relative to one another at respective locations therein. Each of the latch notches 85 lies in a predetermined spaced relationship relative to respective individual ones of the pawl notches 63 (here, midway therebetween).

The shaft 55 is provided with a plurality of cam members in the embodiment shown. One cam member 87 is shown, which is attached to shaft 55 in such a manner (with set screws, not shown) that cam member 87 can easily be adjusted rotationally with respect to eccentric arm 61 for timing development purposes. The circumferential surface of cam member 87, is provided with an appropriate lobe for activating four-way valve 38 which in turn activates cylinder 33 which controls the vertical movement of carriage 22.

In apparatus 10, a desired sequence of operations of carriages 16 and 22 is synchronized by the combined effect of the rotation of the shaft 55 upon which the lobe of cam member 87 depresses the actuation roller of 4-way valve 38 which sends the desired air flow to cylinder 33 and the effect of cylinder 25 being activated by the ratchet lock mechanism (107 and 108) being in its most downward position in which 3-way valve 121 is activated and sends an air pressure signal to air activated 4-way valve 37. Thus, at such time in the machine cycle that holder cups 90 (arranged in rows on individual slat members 51) are positioned exactly under the coring knives 92 the ratchet lock (107 and 108) by the reasoning above causes the main carriage 16 to begin to descent. At approximately the same time, the back portion of cam 87 on shaft 55 leaves the roller portion of valve 38 which, by the reasoning above, causes carriage 22 to begin to travel up relative to carriage 16. By the action of carriage 16 descending, rotating coring knife assemblies 92 cut cleanly through the fruit. At just an instant before the carriage 22 reaches the bottom of its stroke with knife assemblies 92 protruding through the bottom of the fruit, the lobe portion of cam 87 depresses the roller portion of valve 38 and sends air to the upper port of cylinder 33 to move carriage 22 quickly (relative to the whole cycle time) downward to push the ejection rod 105 down to eject the core out through the bottom of the machine. During the time that the above movements are occurring, shaft 55 is continuously rotating and causing eccentric 61 to rotate, thus causing lever arm 76 to travel vertically upward which brings attached unlock mechanism 117 to raised cam follower 114, which in turn raises ratchet lock to unlock position and by so doing deactivates 3-way valve 121 which results in main carriage 16 being quickly (relative to the whole cycle time) returned to its upmost position. At this time the above cycle starts again in machine continuous operation.

Constructional and operational details concerning the apparatus 10 are shown and described in my co-pending U.S. Patent application Ser. No. 958,175, now U.S. Pat. No. 4,252,056, issued on Feb. 24, 1981, the disclosure and teachings of which are completely incorporated hereinto by reference.

In operation of coring apparatus 10, successive rows of fruit holder cups 90 are arranged in spaced relationship to one another transversely across individual slats 51 at equally spaced, longitudinal intervals, and the apparatus 10 is adjusted so that individual cups 90 of rows on slats 51 are generally aligned with the axes of coring knife assemblies 92, respectively, when the conveyor system 42 is in a stop configuration. Thus, the individual cups 90 are loadable by hand or mechanically (not detailed) with fruit members such as citrus fruit 93 remotely from the work station 94. Thus, individual slat members 51, each cup 90 loaded with an individual fruit member 93, sequentially move row-wise to and through a working station 94, but in station 94, the individual cups 90 are so positioned as to be in alignment with the respective individual coring knife assemblies 92 as the part of a normal sequence of operations of the apparatus 10.

The first carriage subassembly 16 supports a plurality of the coring knife assemblies 92, there being one such coring knife assembly 92 for each individual fruit holder cup 90, arranged in a row across the working station 94. The tubular coring knife assembly 92 is rotatably driven by a motor 97 mounted to and supported by carriage frame 19 (by means not detailed). Motor 97 is so oriented that a sheave 98 keyed to and rotatably driven by shaft 99 of motor 97 is aligned with a series of sheaves 100, each sheave 100 being keyed to a different coring shaft 96 by means of a belt 101 driving the sheaves 100 from the sheave 98. For reasons of clearance of belt 101, the two inner sheaves 100 are of smaller diameter than the two outer sheaves 100 in apparatus 10. In order to stablize individual fruit members 93 against rotation during a coring operation involving individual coring shaft 96, each fruit member 93 is stabilized against rotation by means of fruit holders 102 circumferentially disposed about each individual coring knife 92 and adapted to engage upper portions of individual fruit members 93 when a carriage assembly 16 is lowered by means of cylinder 25 in an actual coring operation conducted upon individual fruit members 93, the individual fruit holders 102 being maintained in a stationary non-rotating configuration by supporting rod pairs 103 about each knife 92.

After individual fruit members 93 have been cored, the first carriage subassembly 16 is raised by means of the pneumatic cylinder assembly 25 upwards and away from the working station 94, thereby withdrawing all assemblies 92 from the vicinity of work station 94.

After the carriage assembly 16 has so removed the individual coring knife assemblies from fruit members 93 in working station 94, the conveyor system 42 is advanced to bring new fruit members 93 into position at the working station 94 for coring.

The individual rods 105 are supported and carried by the second carriage subassembly 22 by appropriate hanger means (not detailed). When the pneumatic cylinder assembly 33 has its shaft 35 extended so as to lower the second carriage subassembly 22, the individual rods 105 are moved downwardly so as to forcibly eject any core members retained within the interior of the individual coring knives 92, and to discharge such cores from the bottom portion of each individual coring knife 92. After cores are removed from the individual coring knives 92, the pneumatic cylinder assembly 33 is operated so as to retract the shaft 35 and remove the rods 105 from the mouth portions of the individual coring knives 92. This operation of core removal is accomplished in apparatus 10 when carriage 22 is in its bottom most position. Observe that core removal from individual coring knives 92 is accomplished with the first carriage subassembly 16 in lowered configuration in the vicinity of the work station 94 wherein individual fruit members are cored in operation of the apparatus 10. While operation of carriage subassembly 22 is synchronized with subassembly 16, such operation presents little danger to other portions of apparatus 10 in the event of a failure of synchronization thereof in contrast to the operation of subassembly 16, as those skilled in the art will appreciate. In operation, a plurality of work functions are thus performed by the combination of first carriage subassembly 16 and the second carriage subassembly 22 with the various components carried thereby.

To regulate the travel speeds of the carriages 16 and 22, during the portion of the operating cycle of apparatus 10 in which these carriages are performing their required functions, flow control valve means (not detailed) are associated with the individual valves 37 and 38.

While it is preferred to employ a single ratchet wheel construction as illustrated, those skilled in the art will appreciate that a ratchet wheel can be constructed in any convenient way. For example, a ratchet wheel construction can be utilized by having two wheel members in adjacent, coaxial relationship to one another along shaft 46, one wheel carrying the circumferential pawl notches, the other carrying the circumferential latch notches. Alternatively, a suitable ratchet wheel construction can be provided by using pins extending sidewards from a ratchet wheel near the circumferential edge portions thereof, the pins being in a spaced parallel relationship to the axis of the shaft 46. The location of the pins can be such as to provide either pawl notches or latch notches with the arrangement of components being such as to permit such pins to engage either the pawl 68 or the latch 107 as the orientation and case may be of the respective individual components in a given embodiment of the invention.

For many machine operating safety purposes, the above described interrelationship between crank means, latch means, and pick-up arm means functioning to provide a fail safe locking action on the conveyor system 42 is entirely sufficient.

However, in a further and preferred inventive embodiment of the present invention, there is provided a mechanism which will prevent any nonsynchronous operation of the first carriage subassembly 16 and the pneumatic cylinder subassembly 25, such as could occur in a malfunction when the conveyor system 42 is in motion as the ratchet wheel 62 limitedly rotates as indicated above. In order to prevent such conceivably possible malfunction of the pneumatic cylinder subassembly 25, out of synchronization, the following preferred additional mechanism is incorporated in apparatus 10 as shown:

The 3-way valve assembly 121 is mounted on frame 11 by any convenient means, such as by using a bracket and nut and bolt assemblies (not detailed). The valve 121 is mounted across and adapted for regulating fluid pressure in a conduit 122. Valve 121 here precedes the four-way valve 37; thus, when the valve 121 is closed, no compressed gas, hydraulic liquid, or other operating fluid can pass through the conduit 122 to energize the cylinder 25. The valve 121 is here further provided with spring means (not detailed) normally biasing the valve 121 in a closed position. In addition, the valve 121 includes a blocking valve operating means, such as a lever arm, or the like, which is functional when actuated to open or to close the valve 121 against the action of such spring biasing means. Valve constructions suitable for valve 122 are well known to the prior art. In the embodiment shown, the valve 121 has a conventional valve operating lever 123, which, when compressed inwardly into the body of blocking valve 121, is operative to open the valve 121 for passage of fluid therethrough via line or conduit 122. A valve operating lever 125 has one end thereof fixed to the end of latch support arm 108 adjacent stub shaft 110. The other end of the valve operating lever 125 is configured so as to be in normal continuous engagement with the extended end portion of valve operating arm 123. The valve operating lever 125 is here resilient and arranged to provide a slight biasing pressure against the valve operating arm 123 normally. When the latch member 107 is engaged with ratchet wheel 62 with the face 112 thereof engaged with a latch notch 85, the valve 121 is thus open so that the pneumatic cylinder assembly 25 is operable by the four-way valve 37 while the ratchet wheel 62 is stationary.

When, however, the pick-up arm 117 has engaged the cam follower 114 and the latch member 107 disengaged from the ratchet wheel 62 is being rotated through the action of pawl 68 upon the ratchet wheel 62 while engaged with a pawl notch 63, the valve operating lever 125 is moved by the support arm 108 to a position where the valve 121 is closed (with valve operating arm 123 outwardly extending to a position where the valve 121 is closed) thereby stopping any flow of pneumatic fluid through the conduit 122 and causing the four-way valve 37 to pressurize the piston rod end of the fluid cylinder 25 wherein first carrige subassembly 16 is raised and away from work station 94.

In place of the valve operating lever 125, as those skilled in the art will appreciate, one can employ any regulating means functionally associating the latch means 107 for operating the three-way valve assembly 121 only when the latch member 107 is fully functionally engaged with ratchet wheel 62 and the fluid cylinder assembly 25 is safely operable by the valve 37 when the ratchet wheel 62 is stationary. Thus, the latch support arm 108 can be configured to operate a switch (not detailed) which operates through a relay (not shown) to electrically operate and open blocking valve 121 when latch member 107 is disengaged from latch notches 85 in operation of apparatus 10, or the like as desired.

As can be appreciated from the preceding descritpion, the apparatus 10 can be regarded as a multi-sequence processing apparatus utilizing, as a first subasssembly, a closed loop conveyor system 42, as a second subassembly, the first carriage subassembly 16 and all components associated therewith, and, as a third subassembly, the second carriage subassembly 22 and all components associated therewith. All subassemblies operate synchronously. If an interruption occurs in the operation of such first subassembly from a synchronization standpoint, the fail safe mechanism of the present invention can come into operation to prevent the operation or functioning of the second subassembly. If such interruption of first subassembly occurs, second subassembly will remain in its uppermost position, and not descend. If this were not the case, serious damage would occur to machine members 92, 102, 90 and 51. The first subassembly is here mechanically operated, the second subassembly is here fluidically operated, but a single motor drive is used for the operation of the first subassembly and for the regulating (synchronizing) of the operations of the second subassembly relative to the first subassembly.

Shaft 55 rotates carrying its circumferentially adjustable cam member 87. Cam member 87 is in communication with the 4-way valve 38 which then determines which sides of the cylinder 33 is pressurized. Valve 38 functions to control the secondary carriage 22, air cylinder 33 moves secondary carriage 22.

The importance of the system of the present invention lies in the circumstance that only latch member 107 is locked in position in the bottom of a notch 85, and all of the drive sprockets are in a predetermined orientation (since all of such sprockets are keyed to the shaft 46) and the fruit holding cups are located on the conveyer, as explained, in a correct predetermined axial alignment with the knives 92, can the carriage 16 descend.

If for some reason, the conveyor mechanism does not bring fruit holder cups into predetermined exact alignment with carriage 16, then carriage 16 does not descend and stays up. Valve 121 is closed and sending fluid to valve 37 only when the functional components are exactly aligned with one another in a predetermined manner. Cylinder 25 operates only when valve 37 operates.

Operation of cylinder 25 has nothing to do with the operation of cylinder 33 and its associated secondary carriage 22. Carriage 22 still is permitted to subcycle up and down within carriage 22 which does not hurt any portion of the machine when carriage 22 is raised and up out of the way of, for example, the conveyor assembly. Cylinder 33 can still operate under the control of the four-way fluid valve 38 and the cam 87.

Valve 37 is spring biased to normally send fluid (e.g. air) to cylinder 25 to raise carriage 16, and valve 37 is pilot operated by fluid from the three-way value 121 to send fluid to cylinder 25 to lower carriage 16. However, when the latch is moved back up, it unlocks the system and deactivates the air line connection through valve 121 going to valve 37 and exhausts the fluid already in the line 122 leading to valve 37. Fluid pressure is here held in the cylinder 25 up until the time when it is reversed again during normal cycling. There are only two conditions, either one side of cylinder 25 is pressurized or the other side is.

Referring to FIGS. 8 and 9 there is seen an automatic synchronized multiple station coring application for citrus fruit and the like which is similar to apparatus 10 above described and which is herein designated for convenience by the numeral 200. Those portions of apparatus 200 which are similar to the portions of apparatus 10 are similarly numbered but with the addition of prime marks thereto for convenience. When the apparatus 200 is shut down, as at the end of a shift or for night, the knife assemblies 92' on occasion and randomly happen to be in the down position as shown in FIG. 8. Now, on a subsequent start-up, it has been found that the fluidic system which operates the cylinder 25' may not initially have sufficient line pressure to produce a normal cycling immediately upon actuation of the drive assembly. Consequently, if the conveyor drive system begins to advance with the coring knife assemblies in a down position, for example, damage to the knife assemblies 92' can result. In order to eleviate this potential problem a modification of the present invention has been provided as depicted in FIGS. 8 and 9.

In this modification, at the moment of machine shutdown a residual fluidic pressure exists in the fluidic system as those skilled in the art will appreciate. This pressure is sufficient to actuate the cylinder 25' so as to raise the carriage 16' and thereby withdraw the knife assemblies 92' from any possible interferring contact with individual fruit holder cups 90'. Consequently, at each start-up, the carriage 16' being in its upper most position, is free to descend in a normal machine operating cycle.

In order to achieve these ends, an accumulator 203 is provided in the fluidic systems. For example, shop air may be conveniently connected to the accumulator 203 through, for example, an open valve 204 by way of a line 205. A check valve 206 can optionally be positioned between valve 204 and accumulator 203. Check valve 206 serves to maintain line pressure in the fluidic system, so that if the valve 204 is shut, line pressure is maintained. Leading from the accumulator 203 is a line 207 which leads to a four-way valve assembly herein designated in its entirety by the numeral 209. The valve assembly 209 is actuated by a solonoid 211 that is functionally associated therewith. In the line 207 is a pressure regulator 212 which functions to regulate and maintain a prechosen line pressure. A fluid conditioner 213 is also preferably included in the line 207 for filtering and/or lubricating line fluid. Preferably also, the line 207 is provided with a gauge 214 adapted to permit direct readout of fluid pressure in line 207.

The solonoid 211 is actuated by the closing of a microswitch 215 in the electrical interconnection therewith. In the embodiment 200, the microswitch 215 replaces the three-way valve assembly 121 and is mounted on frame 11 by any convenient means. When the mechanism, as previously described, is in the position to actuate the switch 215 and thereby close same, the solonoid 211 is energized which, in the embodiment shown, results in an actuation of the valve 209 to send pressure to the top chamber of the cylinder 25', thereby causing the piston rod 31' to descend, which causes the carriage 16' to descend, as in normal operation.

When the machine 200 is turned off resulting in the deenergization of the solonoid 211 even with the switch 215 closed with the machine carriage 16' being in its down position the spring biased spool of the valve assembly 209 causes a communication through valve assembly 209 to occur so that fluidic pressure is supplied to the lower chamber of the cylinder 25', thereby causing the rod 31' to ascend and raise the carriage 16'.

The pressure to operate thusly the cylinder 25' is derived either from line pressure or from accumulator 203 pressure. The usual function of the accumulator is to serve as a pressure reservoir to normalize fluidic line pressure.

Preferably line restrictions 216 are provided in the exhaust ports for the four-way valve 209 to give better control of the cylinder 25'. Preferably the restrictions 216 are adjustable for machine control and regulation settings.

Although the teachings of my invention have herein been discussed with reference to specific theories and embodiments, it is to be understood that these are by way of illustration only and that others may wish to utilize my invention in different designs or applications.

I claim:

1. Processing apparatus comprising:
   (A) stationary frame means,
   (B) a motor means having a continuously driven power shaft supported on said frame means,
   (C) a first subassembly guided for longitudinal movement along a portion of said frame means, said first subassembly including a plurality of preselected portions longitudinally arranged relative to one another therealong,
   (D) a second subassembly assembly guided for vertical movement along another poriton of said frame means,
   (E) a stop and go drive means for said first subassembly which is driven by a crank means rotatably powered by said power shaft, with said first subassembly being intermittently advanced along said frame portion for positioning at a predetermined stop position a said preselected portion of said first subassembly,
   (F) a fluid drive means for moving said second subassembly toward a predetermined position relationship with each of said preselected portions when such has been advanced into said predetermined stop position, said fluid drive means including actuation control means having means for actuating said control means, and
   (G) a fail safe regulating means responsive to said predetermined stop position for each said preselected portion, said regulating means allowing actuation of said means for actuating said control means to occur only when said stop and go drive means has advanced each said predetermined portion to said predetermined stop position.

2. The processing apparatus in accordance with claim 1, wherein said means for actuating said control means comprises a fluidic valve means.

3. The processing appartus in accordance with claim 1, wherein said means for actuating said control means comprises an electroswitch means.

4. The processing apparatus in accordance with claim 3, wherein said control means includes a solenoid actuated valve means having continous communication with a fluid operating pressure source, including instances when said processing apparatus is shutdown, said valve means being energized only upon actuation of said electroswitch means to activate said fluid drive means for moving said second subassembly toward said predetermined position relationship, and being effective to activate said fluid drive means for moving said second subassembly away from said predetermined position relationship when said solenoid actuated valve means is deenergized, including instances when said processing apparatus is shutdown.

5. Processing apparatus for coring fruit or the like comprisng in combination:
   (A) stationary frame means,
   (B) a continuously operable motor means,
   (C) a first subassembly moveable along said frame means in a first direction,
   (D) a second subassembly moveable along said frame means in a second direction which is angularly disposed relative to said first direction,
   (E) a stop and go crank drive means drivably connected to said first subassembly and having a plurality of predetermined stop positions and including ratchet wheel means, pawl means, and crank equipped, actuating lever arm means driven by said motor means, said lever arm means operating said pawl means, and said pawl means operating said ratchet wheel means,
   (F) a fluidic drive means for powering said second subassembly, said fluidic drive means being actuated by a first valve means which is responsive to a second valve means, a source of pressurized fluid, and fluid conduit means interconnecting said source, said second valve means, said first valve means, and said fluidic drive means,
   (G) said ratchet wheel means including a plurality of latch notch means defined therein at circumferentially equally spaced intervals relative to one another, each one of said latch notch means corresponding to a different one of said predetermined stop means,
   (H) a pivotable latch assembly means for engagement with an individual one of said latch notch means when said ratchet wheel means is in such a predetermined stop position,
   (I) a pick-up arm means projecting from said lever arm means for engaging with said latch assembly means when said ratchet wheel means is being advanced by said lever arm means from one such predetermined stop position to a next subsequent such predetermined stop position, and
   (J) said second valve means being operable by said latch assembly means, said second valve means being in an open configuration when said latch assembly means is engaged with an individual one of said latch notch means, and in a closed configuration when said latch assembly means is disengaged from said latch notch means, wherein said second valve means supplies pressurized fluid to said first valve means to activate said fluidic drive means only when said pivotable latch assembly means is so engaged with said predetermined stop position.

6. Apparatus for performing a plurality of sequential operative functions in a processing sequence for fruit or the like simultaneously at each individual one of a plurality of processing stations for removal of cores or the like, said stations being arranged in a row, each row being sequentially advanced into an apparatus position for such performing of such operative functions, stopped in position, and then advanced out such apparatus position when such operative functions have been performed, said apparatus comprising:
   (A) a stationary supporting frame means,
   (B) a pair of spaced parallel track bar means supported by said stationary frame means,
   (C) a carriage subassembly guided for vertical reciprocal movements aong said track bar means,
   (D) a fluid cylinder assembly means, including mounting means therefore, adapted to reciprocally move said carriage subassembly relative to said supporting frame means, (E) a conveyor system including a closed loop conveyor means, and conveyor drive means for translatingly moving said conveyor means about a path of travel, (F) fluid valve means including valve operating means for operating said fluid cylinder assembly means and conduit means functionally interconnecting said fluid valve means with said fluid cylinder assembly means and a fluid pressurization source, (G) a motor means, including a driven shaft means driven thereby, (H) stop and go power transfer means providing a plurality of predetermined stop position, said power transfer means coupling said driven shaft means and said conveyor drive means, (I) fluidic control means for operating said fluid valve means including a blocking valve means including conduit connecting means connecting said blocking valve means with said fluid valve means and said source of fluid, said blocking valve means being operable by said stop and go power transfer means, said blocking valve means being in an operative configuration when said stop and go transfer means is in such a predetermined stop position to activate said fluid valve means and being in an inoperative configuration when said predetermined stop and go power tranfer means is between said predetermined stop positions, whereby said fluid valve means is actuated by said blocking valve means to supply pressurized fluid to said fluid cylinder assembly means only when said stop and go transfer means is in such a predetermined stop position.

* * * * *